United States Patent
Verhoog

(10) Patent No.: US 9,551,397 B2
(45) Date of Patent: Jan. 24, 2017

(54) PENDULUM-OSCILLATOR-TYPE DAMPING SYSTEM COMPRISING AN IMPROVED GUIDING DEVICE

(71) Applicant: VALEO EMBRAYAGES, Amiens (FR)

(72) Inventor: Roel Verhoog, Gournay sur Aronde (FR)

(73) Assignee: Valeo Embrayages (FR)

( * ) Notice: Subject to any disclaimer, the term of this patent is extended or adjusted under 35 U.S.C. 154(b) by 0 days.

(21) Appl. No.: 14/351,056

(22) PCT Filed: Oct. 18, 2012

(86) PCT No.: PCT/FR2012/052384
§ 371 (c)(1),
(2) Date: Apr. 10, 2014

(87) PCT Pub. No.: WO2013/057440
PCT Pub. Date: Apr. 25, 2013

(65) Prior Publication Data
US 2014/0251073 A1    Sep. 11, 2014

(30) Foreign Application Priority Data

Oct. 19, 2011 (FR) .................................... 11 59442
Jul. 17, 2012 (FR) .................................... 12 56887

(51) Int. Cl.
*F16F 15/14* (2006.01)
*F16F 15/30* (2006.01)
*F16H 45/02* (2006.01)

(52) U.S. Cl.
CPC ............. *F16F 15/30* (2013.01); *F16F 15/145* (2013.01); *F16H 2045/0263* (2013.01); *Y10T 74/2128* (2015.01); *Y10T 74/2132* (2015.01)

(58) Field of Classification Search
CPC .. F16F 15/1428; F16F 15/13128; F16F 15/31; F16F 7/1022; F16F 7/10; B64G 1/283
USPC ......................................................... 74/574.2
See application file for complete search history.

(56) References Cited

U.S. PATENT DOCUMENTS

| | | | |
|---|---|---|---|
| 5,884,735 A * | 3/1999 | Eckel et al. | 188/378 |
| 6,345,552 B1 * | 2/2002 | Rohrig et al. | 74/574.4 |
| 8,739,523 B2 * | 6/2014 | Huegel et al. | 60/338 |
| 2002/0062713 A1 | 5/2002 | Feldhaus et al. | |
| 2010/0122605 A1 | 5/2010 | Maienschein et al. | |

(Continued)

FOREIGN PATENT DOCUMENTS

| DE | 102009042812 | 5/2010 |
|---|---|---|
| DE | 102010011824 | 10/2010 |

(Continued)

*Primary Examiner* — Vicky Johnson
(74) *Attorney, Agent, or Firm* — Berenato & White, LLC

(57) ABSTRACT

A damping system (10) having a rotation axis (X) and comprising at least: one first flyweight (14) and one second flyweight (14) able to oscillate with respect to a support member (12), and at least one device (20) for guiding the first and second flyweights (14) with respect to the support member (12), having at least one bearing element (22) able to interact with a pair of opposite tracks, respectively a first guidance track (24) and a second guidance track (26) that is carried by the support member (12), wherein the first guidance track (24) is carried by said connecting means (16).

7 Claims, 3 Drawing Sheets

(56) References Cited

U.S. PATENT DOCUMENTS

| | | | |
|---|---|---|---|
| 2010/0269497 A1 | 10/2010 | Engelmann et al. | |
| 2011/0179782 A1* | 7/2011 | Huegel | F16F 15/13128 |
| | | | 60/338 |
| 2012/0255394 A1* | 10/2012 | Maienschein et al. | 74/574.2 |
| 2014/0251075 A1* | 9/2014 | Verhoog | F16F 15/145 |
| | | | 74/574.2 |
| 2015/0075320 A1* | 3/2015 | Verhoog | F16F 15/145 |
| | | | 74/574.2 |

FOREIGN PATENT DOCUMENTS

| | | | | |
|---|---|---|---|---|
| DE | 102011012276 A1 * | 9/2011 | | F16F 15/131 |
| EP | 1744074 A2 * | 1/2007 | | |
| GB | 2354055 | 3/2001 | | |

* cited by examiner

PENDULUM-OSCILLATOR-TYPE DAMPING SYSTEM COMPRISING AN IMPROVED GUIDING DEVICE

CROSS-REFERENCE TO RELATED APPLICATIONS AND CLAIM TO PRIORITY

This application is a national stage application of International Application No. PCT/FR2012/052384 filed Oct. 18, 2012, which claims priority to French Patent Application No. 1159442 filed Oct. 19, 2011 and French Patent Application No. 1256887 filed Jul. 17, 2012, of which the disclosures are incorporated herein by reference and to which priority is claimed.

FIELD OF THE INVENTION

The present invention relates to a pendulum-oscillator-type damping system having an improved guidance device.

BACKGROUND OF THE INVENTION

Damping systems of this kind, also called "pendulum oscillator" or "pendulum" devices and installed especially but not exclusively on the transmission of a motor vehicle, are known from the existing art.

In a motor vehicle transmission, at least one torsional damping system is generally combined with a clutch able to selectively connect the engine to the gearbox, such as a friction clutch or a hydrokinetic coupling apparatus having a locking clutch, the purpose being to filter vibrations resulting from engine irregularities.

This is because a combustion engine exhibits irregularities due to the successive combustion events in the engine's cylinders, said irregularities varying in particular depending on the number of cylinders.

The damping means of a torsional damping system consequently have the function of filtering the vibrations caused by the irregularities, and take effect before engine torque is transmitted to the gearbox.

Vibrations entering the gearbox would otherwise cause shocks, noise, or acoustic impacts therein that are particularly undesirable.

This is one of the reasons why one or more damping means, able to filter vibrations at least at one defined frequency, are used.

In the sector of transmissions, the search for increasingly high filtering performance has led to the addition, for certain applications, of a damping system of the pendulum oscillator type to the damping systems or dampers that are conventionally utilized both in friction clutches and in hydrokinetic coupling devices of motor vehicles.

The document US 2010/0122605 represents one such damping system of the pendulum oscillator type.

The damping system has a support member and at least one pair of flyweights, generally several pairs of flyweights, distributed circumferentially over the periphery of the support member.

The pairs of flyweights are arranged around the rotation axis of the engine shaft, and each pair of flyweights is free to oscillate around an imaginary axis substantially parallel to the rotation axis of the engine shaft.

As illustrated in FIG. 4 of this document, the flyweights of one pair are connected to one another by connecting means such as rivets, each connecting means passing through an opening configured for that purpose in the support member, and the ends of the connecting means each being integral with one of the flyweights of the pair, for example fastened to the flyweights by riveting.

Besides the connecting means, the damping means has at least one device for guiding the flyweights with respect to the support member, the guidance device having bearing elements such as cylindrical rollers.

Each bearing element interacts with a pair of opposite tracks, respectively a first track carried by each of the flyweights of the pair and a second track formed by one of the edges of an orifice that encompasses the support member.

In reaction to rotational inconsistencies, said flyweights become displaced in such a way that the center of gravity of each of the flyweights oscillates around an axis substantially parallel to the rotation axis of the engine shaft.

The radial position of the center of gravity of each of the flyweights with respect to the rotation axis of the engine shaft, as well as the distance of said center of gravity with respect to the imaginary oscillation axis, are established so that in response to centrifugal forces, the oscillation frequency of each of the flyweights is proportional to the rotation speed of the engine shaft; said multiple can assume, for example, a value close to the predominant harmonic order of the vibrations responsible for strong rotational inconsistencies at close to idle speed.

As illustrated in FIG. 4 of the document US 2010/0122605, the damping system has three rivets and two bearing elements that are interposed circumferentially between two consecutive rivets.

A damping system of this kind, however, and very particularly the device for guiding the flyweights, is not entirely satisfactory and exhibits a variety of drawbacks.

The support member is weakened by the presence on the one hand of openings to allow passage of the connecting means, and on the other hand of guidance orifices associated with the bearing elements.

In the example of the document US 2010/0122605, for each pair of flyweights there are thus no fewer than five cutouts required, respectively three openings and two orifices, said cutouts affecting the mechanical strength of the support member.

In addition, the presence of cutouts likewise has an effect on the design of the damping system, given that the openings and orifices, arranged circumferentially on the radial periphery of the support member and successively one alongside the others, limit the number of flyweight pairs that can be installed on a support member of a given diameter.

A damping system of this kind, of the two-strand pendulum type, requires very good cutout stamping quality, which is difficult to achieve given the stamping processes used in industrial production.

This is because usual stamping processes result in the presence of scratches or ridges in the axial direction, i.e. along the thickness.

In the case of the support member, for example, such scratches are present on the edge of each orifice forming the second guidance track with which the bearing element interacts, since the two orifices in the support member, and very particularly of each of the second guidance tracks, are generally produced by conventional press-type stamping.

These surface finish problems also occur with the flyweights having the first guidance tracks for the bearing elements, which are produced on a press by stamping out the flyweights, followed by a trimming operation.

The surface finish of the guidance tracks determines the bearing quality, however, especially the smoothness of motion during rolling. In addition, the surface finish of the guidance tracks has an effect on wear on the bearing element, and on the maximum sustainable contact pressure.

Other specific stamping processes could be utilized in order to improve the surface finish of the guidance tracks, but would then have unacceptable consequence in terms of cost.

In addition, the implementation of at least one orifice order to form, in each of the flyweights, the second guidance track associated with said at least one bearing element results in a commensurate reduction in the total mass of each flyweight, and consequently in the operating efficiency of the damping system, which has a lower total mass for a given overall size.

The axial length of the bearing elements, such as the rollers, also implies a risk of skewing of the flyweights with respect to the support member.

Lastly, when the damping system is under centrifugal force, the bearing elements are then operating in flexural mode, inducing large mechanical stresses in the elements as well as wear problems.

The object of the present invention is therefore very particularly to propose a design that allows the aforementioned drawbacks of a damping system of this kind to be overcome and allows its performance to be improved, while in particular retaining a small overall size and optimum functioning.

SUMMARY OF THE INVENTION

The invention proposes for this purpose a damping system, in particular for a motor vehicle transmission, having a rotation axis and comprising at least:
- a support member able to be caused to rotate around the rotation axis,
- at least one first flyweight and one second flyweight able to oscillate with respect to the support member in a rotation plane orthogonal to the rotation axis, said first and second flyweights being mounted axially on either side of said support member and connected axially to one another by means of at least one connecting means passing axially through an associated opening of said support member, and
- at least one device for guiding the first and second flyweights with respect to the support member, having at least one bearing element able to interact with a pair of opposite tracks, respectively a first guidance track and a second guidance track that is carried by the support member, wherein the first guidance track is carried by said connecting means.

Advantageously, the guidance device according to the invention allows the number of cutouts produced in the support member to be reduced.

Advantageously, the guidance device according to the invention allows the mass of the flyweights of the damping system to be optimized by eliminating the removals of material previously necessary for implementing therein the guidance tracks for the bearing elements.

Thanks to the invention, the flexural forces that previously acted on the bearing elements with the designs of the existing art are eliminated, with the advantage for the bearing elements, which are loaded only in compression, of a reduction in mechanical stress and thus a longer service life due to decreased wear.

According to other characteristics of the invention:
- the connecting means are constituted by at least two spacers present between said first and second flyweights, each spacer being overall in the shape of an "H" having respectively two axial bars whose ends are integral with one or the other of said first and second flyweights, and an intermediate bar that, centrally connecting the axial bars to one another, comprises said first guidance track with which the bearing element interacts;
- the spacer is a one-piece part produced by forging;
- the spacer is implemented in at least two parts, respectively one part that, forming the intermediate bar, has at each end a hole for installing a pair of rivets constituting the other parts;
- in a section along a radial median plane of the support member orthogonally to the rotation axis, the first guidance track carried by the intermediate bar exhibits a concave profile and the second guidance track carried by the support member exhibits a convex profile;
- during operation, the bearing element of the guidance device is stressed exclusively in compression between said first and second guidance tracks;
- the guidance device has axial abutment means in order to limit the axial displacements of each of the flyweights with respect to the support member, said abutment means being carried by said bearing element and interposed radially between the first and second guidance tracks;
- the abutment means are formed by two annular rims that extend radially and are respectively integral with the axial ends of the bearing element;
- the system has at least two guidance devices, respectively at least one first guidance device and one second guidance device, which are interposed axially between said at least one support member and said first and second flyweights;
- the system has a third guidance device that, arranged in a triangle with the other two guidance devices, is intended to ensure axial stability by limiting tilting of the first and second flyweights with respect to said support member;
- the connecting means constitute stop abutment means able to interact with an abutment surface of the opening of the support member in order to limit the oscillations of said at least one flyweight with respect to said at least one support member.

BRIEF DESCRIPTION OF THE DRAWINGS

Other characteristics and advantages of the invention will become evident upon reading the detailed description that will follow, which will be understood by referring to the attached drawings in which.

DETAILED DESCRIPTION

In the description hereinafter and the claims, the terms "external" and "internal," as well as the orientations "axial" and "radial," will be used in non-limiting fashion, and in order to facilitate comprehension, to designate the elements of the damping system in accordance with the definitions given in the description.

By convention, the "radial" orientation is directed orthogonally to the rotation axis (X) of the damping system which determines the "axial" orientation; and, moving away from said axis from inside to outside, the "circumferential" orientation is directed orthogonally to the axis of the damping system and orthogonally to the radial direction.

The terms "external" and "internal" are used to define the relative position of one element with respect to another with reference to the rotation axis of the damping device; an element dose to the axis is thus categorized as "internal" as opposed to an "external" element located radially peripherally.

In the description hereinafter, elements having similar, identical, or analogous functions will be identified with the same reference numbers.

The invention relates to a damping system 10 that, having a rotation axis X, is in particular able to be part of a motor vehicle transmission, said damping system 10 having in particular at least one support member 12 and at least one flyweight 14 in order to form a pendulum oscillator.

Figure 1:
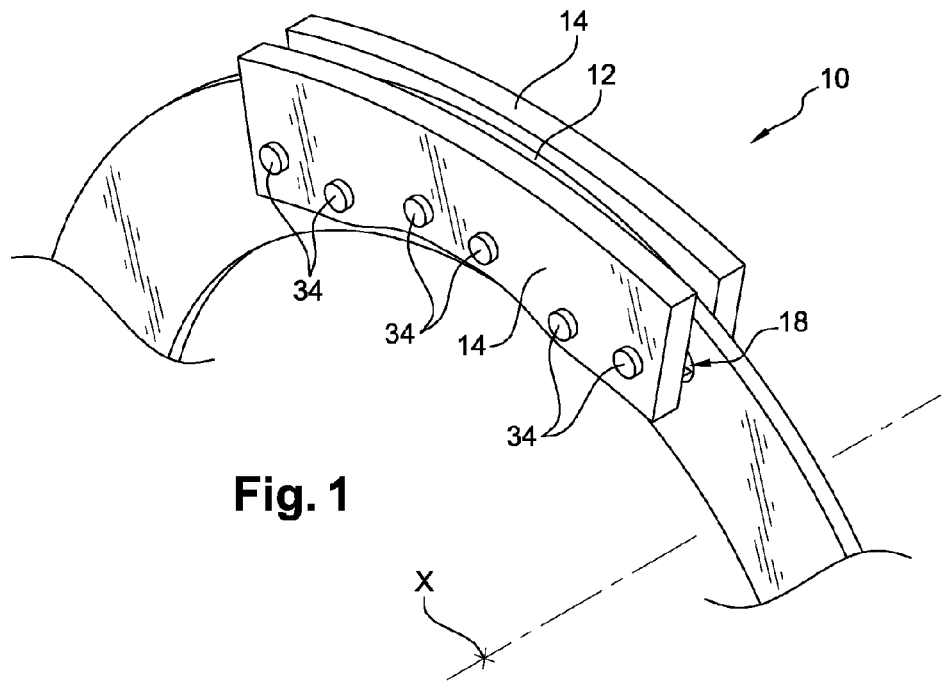
FIG. 1 is a perspective view depicting a damping system of the pendulum oscillator type according to an embodiment of the invention.

FIG. 1 depicts a damping system 10 of the pendulum oscillator type according to an embodiment of the invention, provided solely as a non-limiting example.

In this embodiment, system 10 has a support member 12 and at least one pair of flyweights 14, respectively a first flyweight and a second flyweight, that are arranged axially on either side of said support member 12.

Support member 12 is able to be caused to rotate around rotation axis X of damping system 10.

Support member 12 is overall in the shape of a ring having two planar faces on which said first flyweight 14 and second flyweight 14 are placed.

A damping system 10 of this kind is capable, for example, of being integrated into a torsional damper (not depicted).

In known fashion, a torsional damper of this kind has at least one input element, at least one output element, and circumferentially acting elastic members that are interposed between said input and output elements.

In the aforementioned case of utilization on a motor vehicle transmission, the input element is intended to be caused to rotate by a driving shaft (not depicted), such as the crankshaft of the internal combustion engine of the motor vehicle equipped with the transmission, while the output element is rotationally connected to a driven shaft (not depicted), such as the input shaft of the gearbox of the vehicle which is connected to the gear ratio changing means.

Support member 12 of damping system 10 of the pendulum oscillator type can be constituted by an input element of said torsional damper, an output element, or an intermediate phasing element between two series of springs of said damper or, as a variant, an element rotationally linked to these elements.

Damping system 10 of the pendulum oscillator type can then be carried, for example, by a guide washer or a phase washer, and is arranged on the radial external periphery of said washers.

The shape of support member 12 is consequently capable of varying, depending on the application, from that of the flat ring depicted in FIG. 1.

First and second flyweights 14 are able to oscillate with respect to support member 12 in a rotation plane orthogonal to rotation axis X.

As illustrated in FIG. 1, first and second flyweights 14 are mounted axially on either side of said support member 12. Flyweights 14 are plate-shaped overall and extend circumferentially in a circular arc so that flyweights 14 globally follow the external and internal edges of support member 12.

Figure 2:
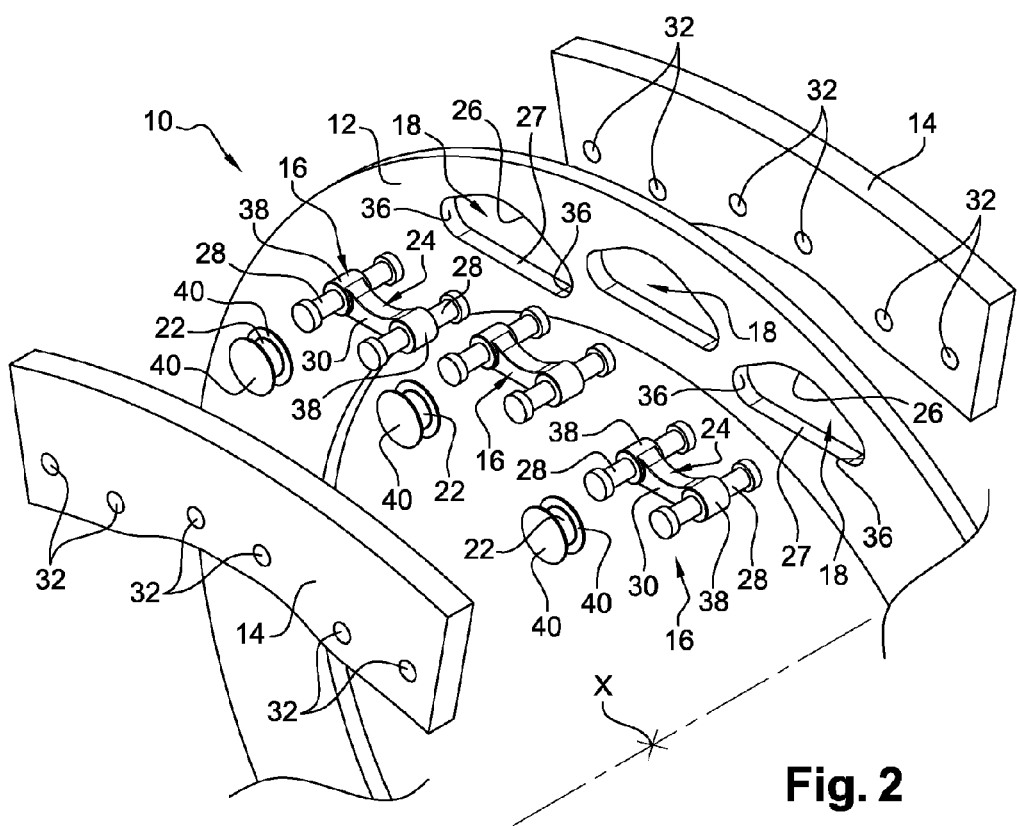
FIG. 2 is an exploded perspective view of the damping system of FIG. 1.
Figure 3:
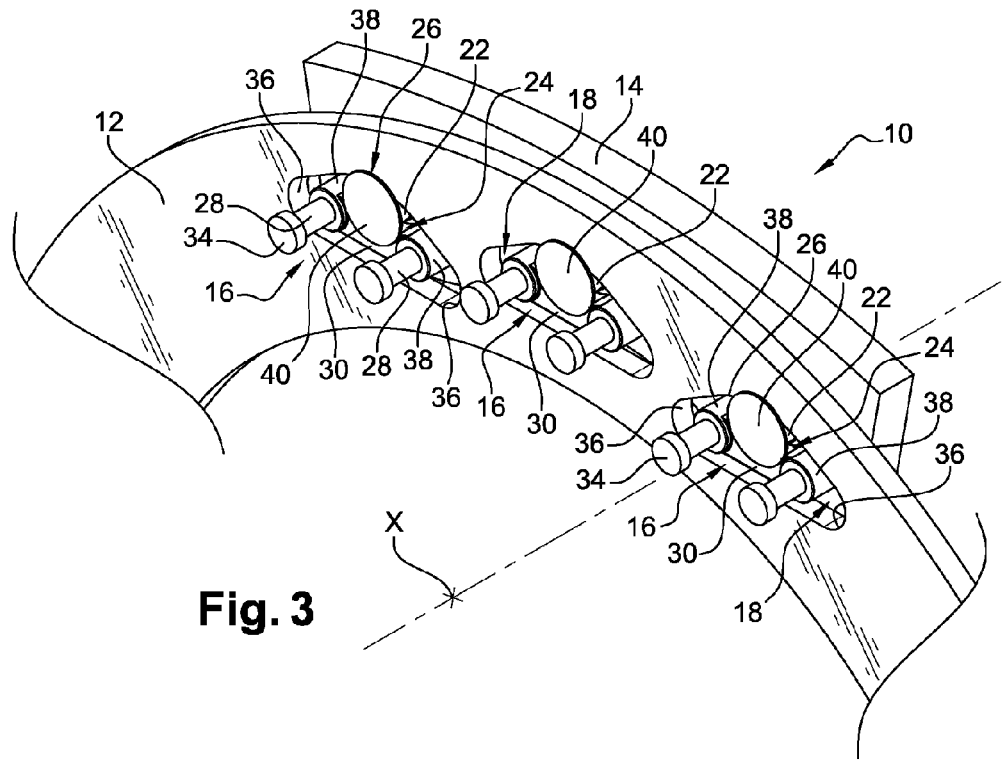
FIG. 3 is a perspective view depicting the damping system of FIGS. 1 and 2 assuming that one flyweight is transparent, illustrating the guidance devices when the damping system is at rest.

As illustrated in particular in FIGS. 2 and 3, the first and second flyweights 14 are connected axially to one another by means of at least one connecting means (or member) 16 passing axially through an associated opening 18 of the support member 12.

The oscillations of flyweights 14 are accompanied by at least one device 20 for guiding first and second flyweights 14 with respect to support member 12.

Guidance The at least guidance device 20 has a single bearing (or rolling) element 22 that is able to interact with a pair of opposite tracks.

According to the invention, the rolling element 22 interacts respectively with a first guidance track 24 carried by the connecting member 16 located between said first and second flyweights 14 and a second guidance track 26 that is carried by the support member 12.

Advantageously, the connecting member 16 form a spacer that in particular determines the axial spacing between flyweights 14 and the clearance with respect to support member 12.

The connecting member 16 are constituted preferably by at least two spacers that are arranged respectively at one and the other end of flyweights 14.

According to the embodiment depicted in the Figures, spacer 16 has the overall shape of an "H" and comprises respectively two axially oriented bars 28 that are connected to one another by an intermediate bar 30.

Intermediate bar 30 centrally connects said axial bars 28 to one another, and has an external surface forming said first guidance track 24 with which bearing element 22 interacts.

Each of the axial bars 28 of spacer 16 has an end that is received in a complementary hole 32 of one of flyweights 14.

Holes 32 are through holes, and flyweights 14 are advantageously fastened to each spacer 16 by riveting, the heads 34 resulting therefrom being more particularly visible in FIG. 1.

The ends of each of the axial bars 28 of spacer 16 are thus integral with one or the other of the first and second flyweights 14.

Advantageously, the spacer 16 is a unitary part, such as a one-piece part produced by forging.

As a variant, the spacer is implemented in at least two parts, respectively one part that forms the intermediate bar and has at each end an axial hole for installation, in each, of one a pair of rivets constituting the other parts.

In a variant of this kind, the parts are advantageously associated with one of these functions: on the one hand, for the part forming the intermediate bar, the function of guiding the bearing element; and for the rivets, the function of connecting the flyweights.

The rolling element 22 is preferably a roller moveable relative to the first guidance track 24 and the second guidance track 26.

The roller is preferably a solid part but, as a variant, could be a hollow part forming a tube.

Each spacer 16 is received in an associated opening 18 of support member 12, said opening 18 having overall a triangular shape.

Opening 18 is demarcated radially by an external edge forming second guidance track 26 of bearing element 22 and, radially oppositely, by an internal edge 27 that here is rectilinear overall.

The external and internal edges of opening 18 are linked at each end by a surface 36 that constitutes an abutment capable of interacting with spacer 16 in order to limit the travel of flyweights 14 during operation.

More specifically, the part of spacer 16 intended to interact with one of the abutment surfaces 36 of opening 18 is constituted by end 38 of intermediate bar 30 of spacer 16, or the one that links to the central segment of each of the axial bars 28.

Spacer 16 that forms the connecting means thus has stop abutment means formed by said ends 38 which are able to limit the oscillations of flyweights 14 with respect to support member 12.

According to a variant that is not depicted, absorption means are interposed between the abutment means formed respectively by ends 38 of spacer 16 and surfaces 36 of opening 18.

According to another variant that is not depicted, the absorption means are interposed radially between bearing element 22 and opening 18 of support member 12.

Absorption means of this kind are constituted, for example, by blocks made of elastomeric material that are interposed between intermediate bar 30 of the rolling element 22 and internal edge 27 of opening 18, in order to prevent any direct contact between the connecting member 16 and support member 12.

Figure 4:
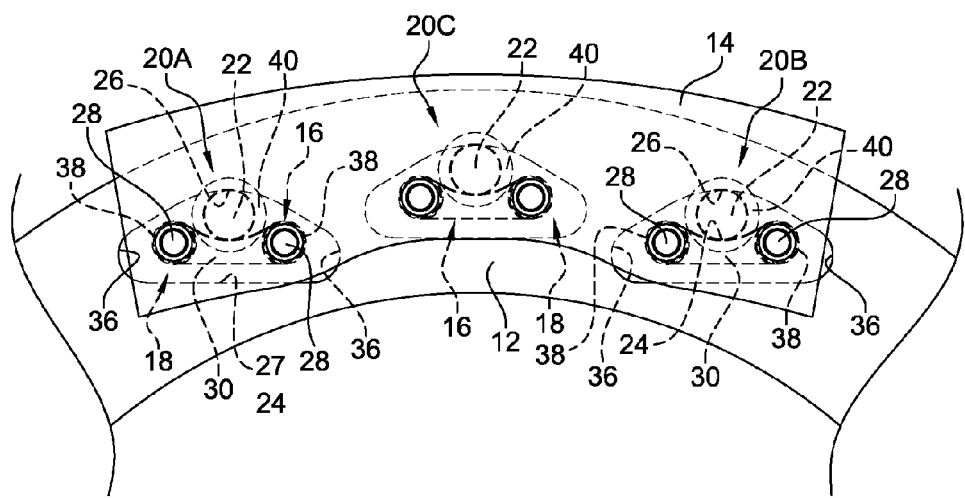
FIG. 4 is a side view of a damping system according to the embodiment depicted in FIGS. 1 to 3.

In a section along a radial median plane of support member 12 orthogonally to rotation axis X, or as illustrated in FIG. 4 by the fact that one of flyweights 14 is made transparent, first guidance track 24 carried by intermediate bar 30 of spacer 16 exhibits a concave profile, and second guidance track 26 carried by support member 12 and formed by the external edge of opening 18 exhibits a convex profile.

Advantageously, during operation bearing element 22 of guidance device 20 is stressed exclusively in compression between said first and second guidance tracks 24, 26, with the result that there is a particular reduction in stress when system 10 is experiencing centrifugal force, and in wear problems on bearing element 22.

Advantageously, said at least one guidance device 20 has axial abutment means 40 in order to limit the axial displacements of each of flyweights 14 with respect to support member 12.

Said abutment means 40 are preferably carried by bearing element 22 and are interposed radially between first and second guidance tracks 24, 26.

As illustrated by FIGS. 2 to 4, abutment means 40 are formed by two annular rims that, extending radially, are respectively integral with the axial ends of bearing element 22.

Figure 6:
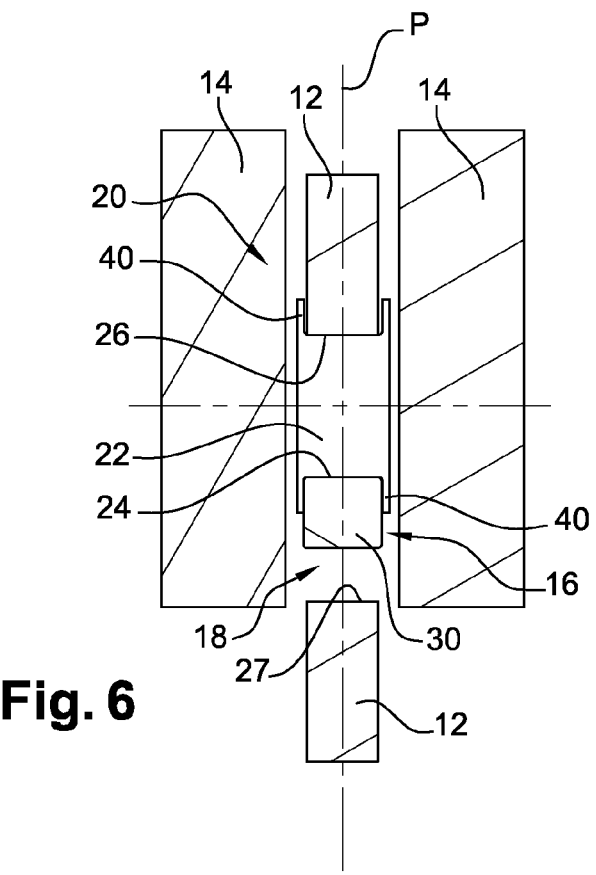

As illustrated in section in FIG. 6, abutment means 40 are capable of coming into interaction with one or the other of the surfaces of support member 12.

Advantageously, abutment means 40 are integral with bearing element 22 so as to form a one-piece assembly.

Damping system 10 preferably has at least two guidance devices 20, respectively at least one first guidance device 20A and one second guidance device 20B, which are interposed axially between said at least one support member 12 and said first and second flyweights 14.

Advantageously, damping system 10 has a third guidance device 20C that analogous to the other two guidance devices 20A and 20B.

Third guidance device 20C is arranged in a triangle with the other two guidance devices 20A, 20B; i.e. it is not aligned with the other two.

Third device 20C is intended to ensure axial stability by limiting the tilting of first and second flyweights 14 with respect to said support member 12.

Bearing element 22 of third guidance device 20O exhibits radially a defined clearance, for example on the order of a few tenths, and thus does not constitute a carrier element of flyweights 14, unlike bearing elements 22 of the other two guidance devices 20A and 20B.

Figure 5:
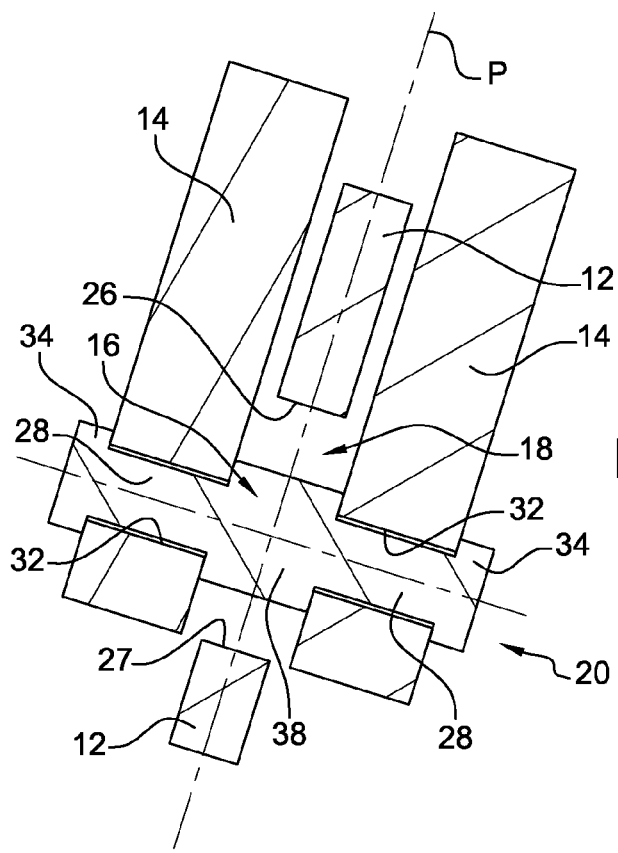
FIGS. 5 and 6 are axially sectioned views depicting the damping system according to FIG. 1 and illustrating more specifically for FIG. 5, a spacer axially connecting the flyweights, and for FIG. 6, the first track which comprises said spacer and with which the bearing element interacts.

Preferably, and as illustrated in the sections of FIGS. 5 and 6, damping device 10 has a design that is symmetrical with respect to a radial median plane P of support member 12 orthogonal to rotation axis X.

The invention claimed is:

1. A damping system (10) having a rotation axis (X) and comprising:
   a support member (12) rotatable around the rotation axis (X);
   a first flyweight (14) and a second flyweight (14) configured to oscillate with respect to the support member (12) in a rotation plane orthogonal to the rotation axis (X), the first and second flyweights (14) being mounted axially on either side of the support member (12) and connected axially to one another by means of a spacer (16) passing axially through an associated opening (18) through the support member (12); and
   a guidance device (20) for guiding the first and second flyweights (14) with respect to the support member (12), the guiding device (20) cooperating only with the spacer (16), the guidance device (20) having a single rolling element (22) configured to interact with a pair of radially opposite tracks, respectively a single first guidance track (24) and a second guidance track (26) carried by the support member (12);
   the single first guidance track (24) being carried by the spacer (16);
   the spacer (16) non-moveably connected to each of the first and second flyweights (14) so that the first and second flyweights (14) being non-moveable relative to one another;
   the spacer (16) and each of the first and second flyweights being moveable relative to the support member (12);
   the single rolling element (22) interacting only with the first guidance track (24) of the spacer and the second guidance track (26) of the support member (12).

2. The damping system (10) according to claim 1, wherein the single spacer (16) constitutes stop abutment means formed by opposite ends (38) thereof configured to interact with an abutment surface (36) of the opening (18) of the support member (12) in order to limit the oscillations of the at least one flyweight (14) with respect to the support member (12).

3. The damping system (10) according to claim 1, comprising two associated openings (18) in the support member (12), two spacers each extending axially through one of the associated openings (18) between the first and second flyweights (14), and two guidance devices (20), respectively: a first guidance device (20A) and a second guidance device (20B), which are interposed axially between the support member (12) and the first and second flyweights (14).

4. The damping system (10) according to claim 1, wherein axially opposite distal ends the spacer (16) are passing axially through associated openings in the first and second flyweights.

5. The damping system (10) according to claim 1, the single spacer (16) is a unitary part.

6. The damping system (10) according to claim 5, the unitary part (16) is a one-piece part.

7. A damping system (10) having a rotation axis (X), the damping system (10) comprising:
- a support member (12) rotatable around the rotation axis (X);
- a first flyweight (14) and a second flyweight (14) configured to oscillate with respect to the support member (12) in a rotation plane orthogonal to the rotation axis (X), the first and second flyweights (14) being mounted axially on either side of the support member (12);
- a connecting member (16) axially connecting the first and second flyweights (14) to one another, the connecting member (16) passing axially through an associated opening (18) through the support member (12); and
- a guidance device (20) for guiding the first and second flyweights (14) with respect to the support member (12), the guidance device (20) having a bearing element (22) configured to interact with a pair of radially opposite tracks, respectively a first guidance track (24) and a second guidance track (26);
- the first guidance track (24) being carried by the connecting member (16);
- the second guidance track (26) being carried by the support member (12);
- the opening (18) through the support member (12) being demarcated radially by a concave external edge forming the second guidance track (26) of the bearing element (22) and, radially oppositely, by a rectilinear internal edge (27).

\* \* \* \* \*